US012450268B2

(12) United States Patent
Lim et al.

(10) Patent No.: US 12,450,268 B2
(45) Date of Patent: Oct. 21, 2025

(54) EFFICIENT SEARCH QUERY AUTO-COMPLETION FROM UNSTRUCTURED TEXT

(71) Applicant: SAP SE, Walldorf (DE)

(72) Inventors: Jia Xiang Lim, Singapore (SG); En Zhi Tan, Singapore (SG); Benjamin Yan Han Yap, Singapore (SG); Benjamin Jin Boon Tan, Singapore (SG); Lenald Ng, Singapore (SG); Min Pyae Moe, Singapore (SG); Pern Piao Calvin Soh, Singapore (SG); Steven Peng Chen Fu, Singapore (SG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/359,150

(22) Filed: Jul. 26, 2023

(65) Prior Publication Data

US 2025/0036667 A1 Jan. 30, 2025

(51) Int. Cl.
*G06F 16/332* (2025.01)
*G06F 40/232* (2020.01)
*G06F 40/274* (2020.01)
*G06F 40/295* (2020.01)

(52) U.S. Cl.
CPC ........ *G06F 16/3322* (2019.01); *G06F 40/232* (2020.01); *G06F 40/274* (2020.01); *G06F 40/295* (2020.01)

(58) Field of Classification Search
CPC .. G06F 16/3322; G06F 40/232; G06F 40/274; G06F 40/295
See application file for complete search history.

(56) References Cited

U.S. PATENT DOCUMENTS

| 8,965,911 | B2* | 2/2015 | Dinwoodie | G06F 16/322 |
| | | | | 707/E17.05 |
| 9,002,847 | B2* | 4/2015 | Eliassaf | G06V 30/268 |
| | | | | 707/737 |
| 9,965,460 | B1* | 5/2018 | Wasiuk | G06F 40/295 |
| 11,106,690 | B1* | 8/2021 | Dhillon | G06N 5/01 |
| 12,210,517 | B2* | 1/2025 | Rusnak | G06F 16/90324 |

(Continued)

FOREIGN PATENT DOCUMENTS

| CN | 112818694 A | * | 5/2021 |
| KR | 20210126110 A | * | 10/2021 |

OTHER PUBLICATIONS

Gao, Wenchao, Xiaohui Zheng, and Shanshan Zhao. "Named entity recognition method of Chinese EMR based on BERT-BILSTM-CRF." Journal of physics: conference series. vol. 1848. No. 1. IOP Publishing, 2021. (Year: 2021).*

*Primary Examiner* — Dennis Truong
(74) *Attorney, Agent, or Firm* — Fish & Richardson P.C.

(57) ABSTRACT

Methods, systems, and computer-readable storage media for receiving a set of descriptions provided as unstructured data, each description associated with one or more entities in a set of entities that can be queried using the IR system, providing, from the set of descriptions, a first set of training data including at least a first set of entities including at least a portion of the set of entities, training a named-entity recognition (NER) model using at least a portion of the first set of training data, receiving, by the IR system, a portion of a search query, and providing a set of auto-complete suggestions based on the portion of the search query and the NER model.

20 Claims, 7 Drawing Sheets

(56) References Cited

U.S. PATENT DOCUMENTS

| | | | | |
|---|---|---|---|---|
| 2003/0033288 A1* | 2/2003 | Shanahan | ............ | G06F 16/3344 |
| 2008/0168039 A1* | 7/2008 | Carpenter | ............. | G06F 16/957 |
| 2008/0294982 A1* | 11/2008 | Leung | ................... | G06F 40/274 |
| | | | | 715/261 |
| 2012/0173500 A1* | 7/2012 | Chakrabarti | .......... | G06F 16/951 |
| | | | | 707/706 |
| 2013/0179419 A1* | 7/2013 | Hsu | ..................... | G06F 16/2246 |
| | | | | 707/723 |
| 2016/0012020 A1* | 1/2016 | George | .................. | G06F 40/30 |
| | | | | 704/9 |
| 2017/0364502 A1* | 12/2017 | Ganesalingam | ...... | G06F 40/274 |
| 2018/0150160 A1* | 5/2018 | Gupta | ................... | G06F 40/274 |
| 2019/0108216 A1* | 4/2019 | Colic | ..................... | G06F 40/295 |
| 2019/0236178 A1* | 8/2019 | Jagota | ................. | G06F 16/2246 |
| 2019/0370393 A1* | 12/2019 | Finch | ................... | G06F 16/3338 |
| 2019/0384762 A1* | 12/2019 | Hill | ...................... | G06F 16/2272 |
| 2021/0192133 A1* | 6/2021 | La Rocca | ............... | G06F 18/24 |
| 2021/0248321 A1* | 8/2021 | Cheng | .................. | G06F 16/954 |
| 2022/0035799 A1* | 2/2022 | Bhutada | .................. | G06F 40/30 |
| 2022/0269862 A1* | 8/2022 | Li | .......................... | G06N 3/042 |
| 2022/0342936 A1* | 10/2022 | Li | ......................... | G06F 16/9537 |
| 2022/0414228 A1* | 12/2022 | Difonzo | ............ | G06F 16/24522 |
| 2023/0045347 A1* | 2/2023 | Grady | ..................... | G06N 5/02 |

\* cited by examiner

EFFICIENT SEARCH QUERY AUTO-COMPLETION FROM UNSTRUCTURED TEXT

BACKGROUND

Computer-executed information retrieval (IR) systems, also referred to as search systems and/or search engines, enable users to input search queries and receive search results that are responsive to the search queries. IR systems can include features, such as auto-complete and auto-correct that not only improve user experience, but also improve efficiencies in execution of IR systems. Auto-complete and auto-correct functions streamline execution conserving technical resources that would otherwise be expended. However, ensuring that auto-complete and auto-correct functions are current and complete poses technical challenges.

SUMMARY

Implementations of the present disclosure are directed to auto-correct and auto-complete functions of information retrieval (IR) system. More particularly, implementations of the present disclosure are directed to an IR system that provides auto-complete and auto-correct functionality using a Bidirectional Encoder Representations from Transformers (BERT)-based model and a ranked trie-tree (RTT). The IR system of the present disclosure enables auto-completion and auto-correction on continuously evolving word corpuses of searchable items and in instances where up-to-date search queries are not readily available. Further, the IR system of the present disclosure provides resource- and time-efficient search query auto-completion, auto-correction, and ranking of suggested search queries to display to users.

In some implementations, actions include receiving a set of descriptions provided as unstructured data, each description associated with one or more entities in a set of entities that can be queried using the IR system, providing, from the set of descriptions, a first set of training data including at least a first set of entities including at least a portion of the set of entities, training a named-entity recognition (NER) model using at least a portion of the first set of training data, receiving, by the IR system, a portion of a search query, and providing a set of auto-complete suggestions based on the portion of the search query and the NER model. Other implementations of this aspect include corresponding systems, apparatus, and computer programs, configured to perform the actions of the methods, encoded on computer storage devices.

These and other implementations can each optionally include one or more of the following features: actions further include processing the set of descriptions through the NER model to provide a second set of entities, generating a word corpus based on the first set of entities and the second set of entities, training an auto-correct model using a second set of training data that is provided using at least a portion of the word corpus, and prior to providing the set of auto-complete suggestions, processing the portion of the search query through the auto-correct model to correct at least part of the portion of the search query; the second set of training data includes the at least a portion of the word corpus and noise that is generated based on the at least a portion of the word corpus; training the NER model includes receiving the NER model as a pre-trained model, and fine-tuning the NER model through training using the at least a portion of the first set of training data; the NER model is a BERT-based model; actions further include determining a word corpus based on the NER model, the word corpus including unique entities determined from the set of descriptions, each unique entity being associated with a score, wherein providing a set of auto-complete suggestions based on the portion of the search query and the NER model includes ranking auto-complete suggestions based on scores; and each score represents a frequency of occurrence of a respective unique entity in the set of descriptions.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
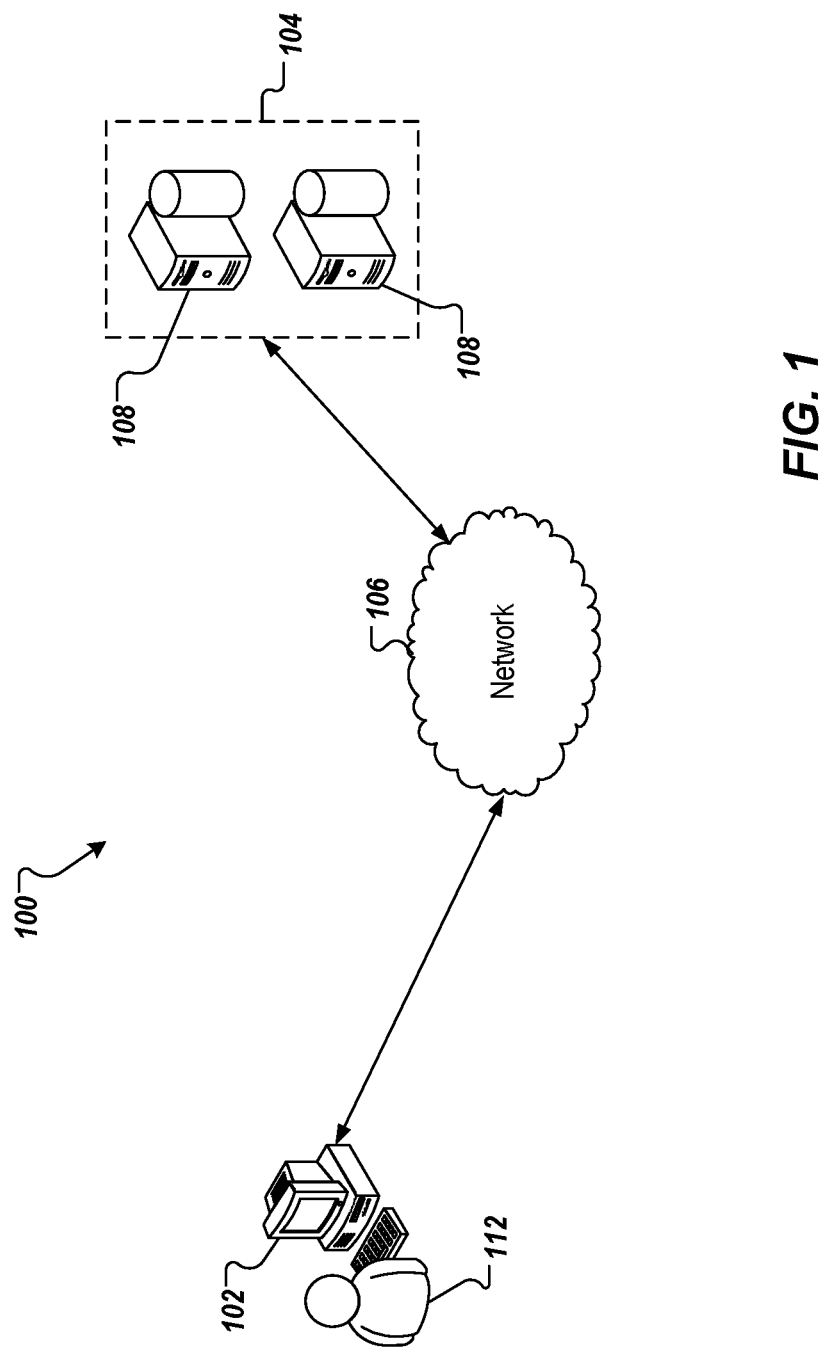
FIG. 1 depicts an example architecture that can be used to execute implementations of the present disclosure.

Implementations of the present disclosure are directed to auto-correct and auto-complete functions of information retrieval (IR) system. More particularly, implementations of the present disclosure are directed to an IR system that provides auto-complete and auto-correct functionality using a Bidirectional Encoder Representations from Transformers (BERT)-based model and a ranked trie-tree (RTT). The IR system of the present disclosure enables auto-completion and auto-correction on continuously evolving word corpuses of searchable items and in instances where up-to-date search queries are not readily available. Further, the IR system of the present disclosure provides resource- and time-efficient search query auto-completion, auto-correction, and ranking of suggested search queries to display to users.

Implementations can include actions of receiving a set of descriptions provided as unstructured data, each description associated with one or more entities in a set of entities that can be queried using the IR system, providing, from the set of descriptions, a first set of training data including at least a first set of entities including at least a portion of the set of entities, training a named-entity recognition (NER) model using at least a portion of the first set of training data, receiving, by the IR system, a portion of a search query, and providing a set of auto-complete suggestions based on the portion of the search query and the NER model.

To provide further context for implementations of the present disclosure, and as introduced above, computer-executed information retrieval (IR) systems, also referred to as search systems and/or search engines, enable users to input search queries and receive search results that are responsive to the search queries. IR systems can include features, such as auto-complete and auto-correct that not only improve user experience, but also improve efficiencies in execution of IR systems. Auto-complete and auto-correct functions streamline execution conserving technical resources that would otherwise be expended. For example, if a user misspells one or more words in a search query, the search results returned will not be completely responsive to the user's intent. Consequently, the user would re-enter the search query with corrected spelling and re-run the search. These iterations needlessly consume technical resources (e.g., processors, bandwidth) in ultimately providing search results that are responsive to the user's intent. As another example, auto-complete enables users to select search queries that align with their intent to reduce a number of iterations of querying before satisfactory search results are provided.

In traditional IR systems, functionality, such as auto-correct and auto-complete, focuses on previously received search queries to correct and/or complete new (e.g., previously unseen) search queries. However, in the relatively rapid and continuously evolving nature of searchable items, up-to-date search queries are not readily available. Further, the collection of search queries itself may pose complications. For example, regulatory frameworks (e.g., user privacy) can limit use of previously submitted search queries. These factors, among others, pose a non-trivial challenge to implementing current and comprehensive search query-based auto-completion and correction functionality.

In view of the above context, implementations of the present disclosure provide an IR system that provides auto-complete and auto-correct functionality using using a BERT-based model and a RTT. The IR system of the present disclosure enables auto-completion and auto-correction on continuously evolving word corpuses of searchable items and in instances where up-to-date search queries are not readily available. Further, the IR system of the present disclosure provides resource- and time-efficient search query auto-completion, auto-correction, and ranking of suggested search queries to display to users. The IR system of the present disclosure does this dynamically, in real-time, in response to user input.

Implementations of the present disclosure are described in further detail herein with reference to an example context. The example context includes an electronic commerce (e-commerce) platform that includes an IR system that users can use to search for goods and/or services available through the e-commerce platform. It is contemplated, however, that implementations of the present disclosure can be realized in any appropriate context.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an IR system that enables users to execute searches using auto-complete and/or auto-correct functions. For example, the user 112 can input search queries that are processed by the IR system to return search results that are responsive to the search queries. In some implementations, and as discussed in further detail herein, the IR system of the present disclosure provides functions, such as auto-correct and/or auto-complete using named-entity extraction to generate candidate search queries. The candidate search queries are used to generate a RTT, that is used to resource- and time-efficiently perform search query auto-completion, auto-correction, and ranking of suggested search queries to display to users.

In further detail, the IR system of the present disclosure includes a pipeline including a NER model and a RTT. As described in further detail herein, the pipeline need only receive unstructured text (e.g., item names, item descriptions, etc.) as input. In some implementations, the NER model is trained using distant supervision, in which highly precise entities are extracted from the text using constituency parsing rules. The extracted entities are used as training data to train a universal model. In some examples, the universal model is based on a pre-trained BERT model. This approach is akin to bootstrapping, which uses precise seed entities to train models that gradually increase entity extraction recall. The trained NER model is used to extract entities and corresponding confidence scores from the unstructured text that had originally been provided.

In some implementations, the extracted entities and confidence scores are used to construct the RTT. The RTT can be described as an efficient data structure that is usable to query and obtain top-k entities given any incomplete search query. Unlike a traditional trie, where all matched entities have to be traversed, the RTT of the present disclosure is able to perform order-specific traversal and terminate once k entities are found based on confidence score. This drastically reduces time needed for each query, for example, in the situation where the number of matching entities is large. In addition, the RTT is also able to handle spelling errors in the search query that is input by employing a distilBERT-based model when no matches are found due to misspellings. In some examples, the distilBERT-based model is trained by injecting noise into extracted entities of the NER model and optimizing the distilBERT-based model to predict correct spelling.

Figure 2:
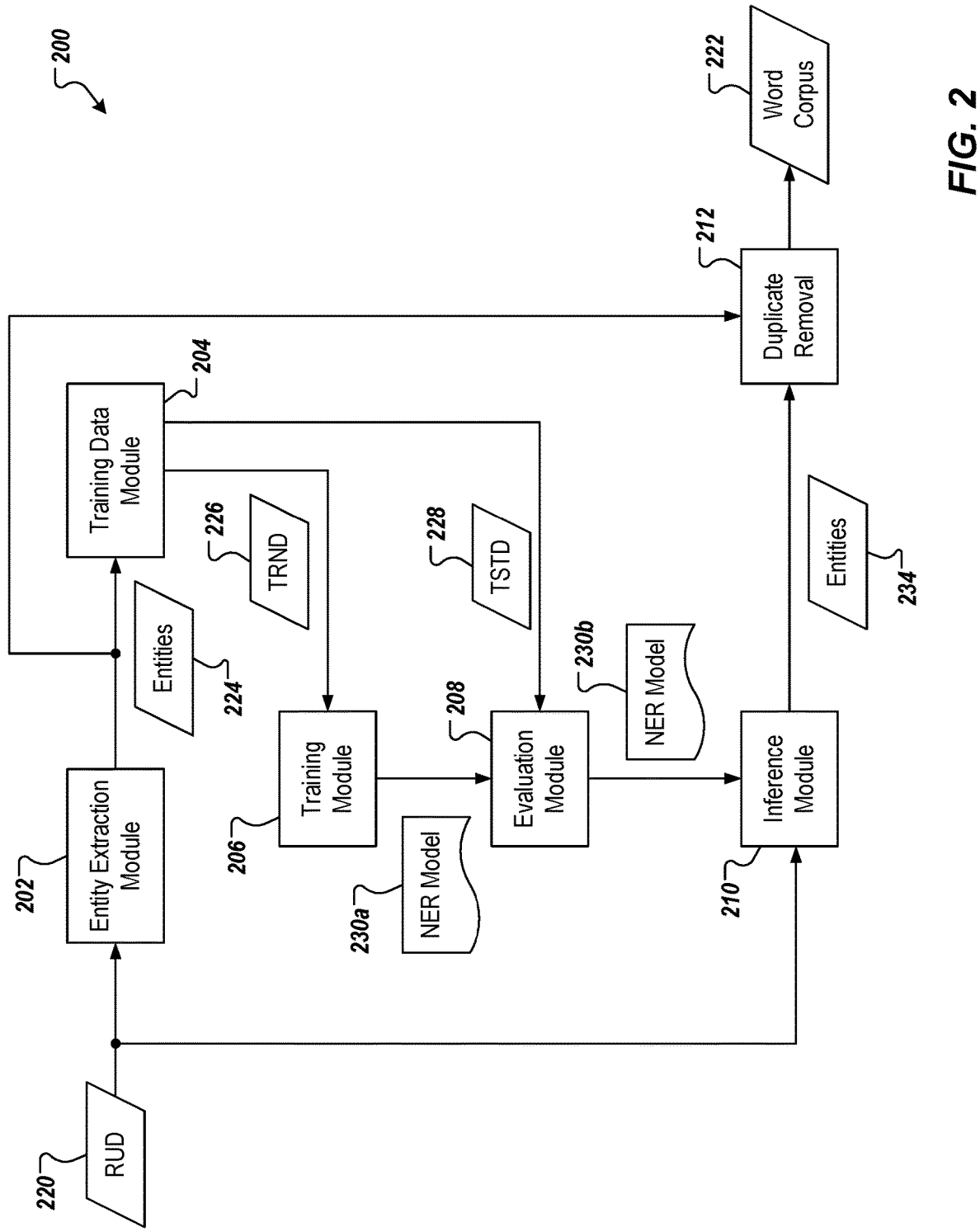
FIG. 2 depicts an example conceptual architecture for entity extraction in accordance with implementations of the present disclosure.

FIG. 2 depicts an example conceptual architecture 200 for entity extraction in accordance with implementations of the present disclosure. In the example of FIG. 2, conceptual architecture 200 includes an entity extraction module 202, a training data module 204, a training module 206, an evaluation module 208, an inference module 210, and a duplicate removal module 212. As described in further detail herein, raw unstructured data (RUD) 220 is processed to provide a set of extracted entities as a word corpus 222.

In further detail, named-entity extraction is carried out by using a natural language processing (NLP) framework together with handcrafted linguistic rules to identify seed entities with high precision using a corpus of text descriptions. These entities are used to label the corpus, which serves as training data for a BERT-based NER model. The intuition behind such an approach that mirrors bootstrapping, where the rule-based approach will provide training data with high precision at the expense of recall. By feeding in only these precise positive examples as training data, the NER model will be able to further extract additional entities from the unlabeled corpus of item descriptions.

With reference to FIG. 2, the entity extraction module 202 receives the RUD 220 and executes rule-based extraction to provide a set of entities 224. In some examples, the rule-based extraction is performed using part-of-speech (POS) tags that can be extracted using, for example and without limitation, Spacy, a publicly available NLP framework. In the example context, the RUD 220 can include item descriptions for goods and/or services available through the e-commerce platform. More generally, the RUD 220 is unstructured textual data that represents entities that could be the subject of search queries. In the example context, Spacy is executed to tag each word in the item description with a respective POS-tag. To determine whether a group of words constitutes as an entity, the POS-tags of the word group has to match at least one linguistic rule. In some examples, a linguistic rules can provide that one or more consecutive tokens/words that are alphabetic and whose POS-tag is in the list nountags [NN, NNP, NNS, NOUN, NNPS, CD], where-NN: Noun, singular or mass; NNP: Proper noun, singular; NNS: Noun, plural; NNPS: Proper noun, plural; CD: Cardinal number; and NOUN: General tag for nouns (in some tag sets).

The set of entities 224 is provide to the training data module 204, which pre-processes the set of entities 224 to provide data for training of a NER model 230a. The data for training is divided into training data (TRND) 226 and test data (TSTD) 228. Data are preprocessed using BIO tags (e.g., tags using the beginning, inside, outside (BIO) tagging scheme), wherein each word within a sentence—from which entities are to be extracted—is assigned a BIO tag. In this tagging scheme, 'B' denotes the beginning of an entity, 'I' stands for inside the entity, and 'O' signifies that a word is outside the entity. For instance, consider the sentence "Apple Iphone 14 is a product from Apple Inc." In this sentence, 'Apple' is tagged as 'B' indicating the start of an entity. The words 'Iphone' and '14' are tagged as 'I', showing they are part of the ongoing entity. Meanwhile, 'is', 'a', 'product', and 'from' are tagged as 'O', illustrating they are outside any entity. Lastly, 'Apple' is again tagged as 'B' as it begins a new entity and 'Inc' as 'I', signifying it belongs to the entity started by 'Apple'. This tagging strategy aids in effective entity recognition.

Figure 3:
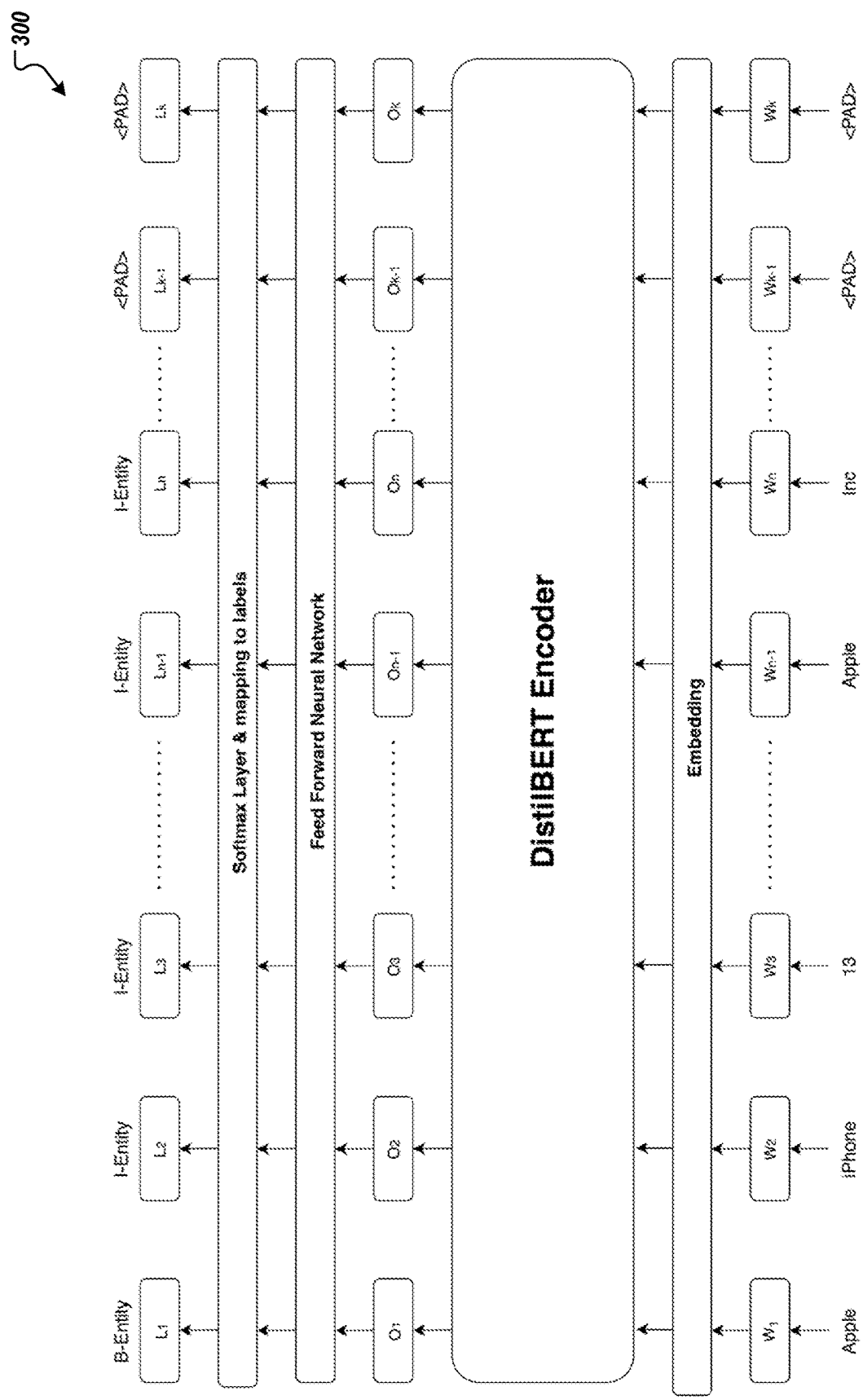
FIG. 3 depicts an example representation of a named-entity recognition (NER) model in accordance with implementations of the present disclosure.

The training module 206 receives the training data 226 to train the NER model 230a. In some implementations, the NER model 230a is provided as a pre-trained DistilBERT model that is fine-tuned by the training module 206 using the training data 226. A DistilBert model can be described as a distilled form of a BERT model. FIG. 3 depicts an example representation 300 of the NER model 230a as a DistilBert model. In some examples, the NER model 230a is trained to predict either an entity label or a non-entity label, as described in further detail herein.

In general, the NER model 230a, as a machine learning (ML) model, can be iteratively trained, where, during an iteration, one or more parameters of the ML model are adjusted, and an output is generated based on the training data. For each iteration, a loss value is determined based on a loss function. The loss value represents a degree of accuracy of the output of the ML model. The loss value can be described as a representation of a degree of difference between the output of the ML model and an expected output of the ML model (the expected output being provided from training data). In some examples, if the loss value does not meet an expected value (e.g., is not equal to zero), parameters of the ML model are adjusted in another iteration of training. In some instances, this process is repeated until the loss value meets the expected value. In some examples, and because this is a classification task, the NER model 203 model is trained (fine-turned) using cross-entropy loss.

In some examples, the (trained) NER model 230a is provided to an evaluation module 208 that evaluates performance of the NER model 230a using the test data 228. In some examples, if the NER model 230a is not performing as expected, the NER model 230a can be re-trained and/or tuned until performance (e.g., accuracy) achieves some threshold performance. This process results in a NER model 230b (e.g., the NER model 230a after evaluation and revising, if any).

In the example of FIG. 2, the NER model 230b is provided to an inference module 210 that process the RUD 220 through the NER model 230b to generate a set of entities 234. More particularly, the RUD 220 is provided as input to the NER model 230b, which provides the set of entities 234 as output. Here, entities in the set of entities 234 can be described as entities that the NER model 230b predicts to be represented in the RUD 220. In some implementations, entity extraction is executed by the NER model 230b as a word-level classification problem, where each word can be classified with an entity label or non-entity label. In some examples, the beginning, inside, outside (BIO) tagging scheme is used, which is shown to be useful in NER and entity extraction tasks. An example of projecting extracted entities back to the unlabeled text is shown in Table 1 for the example item description "The Samsung Galaxy S22 Ultra supports the S Pen.":

TABLE 1

Example Word Labeling (BIO tagging)

| Word | Label |
| --- | --- |
| The | Non-Entity |
| Samsung | B-Entity |
| Galaxy | I-Entity |
| S22 | I-Entity |
| Ultra | O-Entity |
| supports | Non-Entity |
| the | Non-Entity |
| S | B-Entity |
| Pen | O-Entity |
| . | Non-Entity |

The set of entities 224 and the set of entities 234 are provided as input to the duplicate removal module 212, which processes both to provide the word corpus 222. For example, the duplicate removal module 212 combines the set of entities 224 and the set of entities 234 into a super-set of entities and removes any duplicate entities, the word corpus 222 being provided as the remaining, non-duplicative entities.

In further detail, the duplicate removal module 212 receives the set of entities 224 and the set of entities 234. Any entities that are in the set of entities 234, but are absent from the set of entities 224 are added to the set of entities 224 to provide the super-set of entities. The super-set of entities is processed to assign a score to each entity. The score reflects the frequency of occurrence of the entity. To illustrate, an entity such as "iPhone 14," appearing three times within the super-set of entities, would garner a score of 3. Following this, the process will yield unique entities alongside their corresponding scores, which is provided as the word corpus 222. That is, the word corpus 222 includes unique entities from the super-set of entities and a score (frequency) for each entity. A rank order will then be established, with entities boasting the highest scores occupying the topmost positions and those with lower scores positioned correspondingly. These ranked entities, exemplified by {"apple iphone": 1, "apple macbook": 2, "apple ipad": 3} where the number denotes the rank, serve as the foundation for constructing the RTT. Suppose a user initiates a search by typing the prefix "app." In this scenario, "apple iphone," by virtue of its top rank, will be the premier suggestion in the list of entities returned by the RTT.

With regard to the RTT, use of tries for auto-complete searches is generally known, where trie searches are able to perform exact auto-complete searches with minimal computational complexity. However, a problem with existing approaches using tries can be formulated as follows: given a finite set of strings S over an alphabet A with a scoring function $F_{score}: S \mapsto \mathbb{R}$, and given a user search string $s_{search}$ and a user-defined required number of strings k, return the set of k strings with $s_{search}$ as a prefix that have the highest scores. More specifically, an l-character alphabet A can be defined as a set $A=\{a_1, a_2, \ldots, a_l\}$ and the corpus as a set of ordered tuples where any m-character string $s \in S$ can be expressed as an ordered tuple $\langle \alpha, c_1, c_2, \ldots, c_m, \omega | c_{i, i \in [1,m]} \in A \rangle$, where $\alpha$ and $\omega$ represent the start-of-word token and end-of-word token respectively. For some string $s=\langle \alpha, c_1, c_2, \ldots, c_m, \omega \rangle$, a prefix set can be defined as:

$$H(s) = \qquad (1)$$

$$\{\langle \alpha \rangle, \langle \alpha, c_1 \rangle, \langle \alpha, c_1, c_2 \rangle, \ldots, \langle \alpha, c_1, c_2, \ldots, c_{m-1} \rangle, \langle \alpha, c_1, c_2, \ldots, c_m \rangle\}$$

A trie can be defined as a directed graph with nodes N and directed edges E where:

$$N = U_{s \in S} H(s) \qquad (2)$$

$$E = \{(n_i, n_j) | n_j \in N \wedge |n_i| = |n_j| + 1 \wedge n_i \in H(n_j)\} \qquad (3)$$

Accordingly, the root node of the trie is the $\langle \alpha \rangle$ dummy string and every leaf node should contain a string ending with the $\omega$ token.

During an unranked trie search, the node corresponding to the user search string $s_{search}$ (this contains the start-of-word token a but not the end-of-word token $\omega$) is found and its sub-graph is traversed to find all its child nodes to return the set of results (i.e., $S_{result}=\{s \in S | s_{search} \in P(s)\}$). Given that $|S_{result}|=L$ and the maximum tree depth is m, the worst-case time complexity to retrieve all auto-complete candidates is given by O(mM) (assuming mL<<$l^m$).

However, in a ranked search, the aim is to obtain the top-k auto-complete candidate strings. This can be done by sorting the candidates in the result set $S_{result}$ by score and returning the top k strings. To achieve this in a more optimal manner, the trie can be constructed such that each node stores additional metadata that facilitates more efficient retrievals of top-ranked candidate strings. While there have been proposed solutions for this top-k auto-complete retrieval problem they involve the storing of the maximum score of all child nodes at each node. This requires maintaining of a priority queue of potential nodes that includes the two best scoring nodes at each level along the traversed path. This approach has been extended to accommodate multiple candidate nodes to allow for approximate autocomplete. However, a worst-case time complexity for this approach, given a l-character alphabet and m-level trie, is given by O(mllog (ml)) due to the need to sort the priority queue.

In view of this, implementations of the present disclosure provide a computationally efficient ranked trie search for the purpose of auto-complete that can support approximate search in the form of multiple starting candidate nodes with minimal overhead. Further, implementations of the present disclosure provide an extension to flexibly accelerate the retrieval by storing additional metadata at each node.

In further detail, a trie is constructed with each node given a score. The score of a leaf node is the score of the corresponding string and the score of each node is the maximum score of all its children. Given the trie defined in Equation 2 and 3, above, a parent node function P and child nodes function C can be defined as follows:

$$P(n) = parentnodeofn \qquad (4)$$

$$C(n) = setofchildnodesofn = \{n' : (n, n') \in E\} \qquad (5)$$

The metadata function that assigns the score to each node $A: N \mapsto \mathbb{R}$ is given by:

$$A(n) = \begin{cases} F_{score}(n) & \text{if } n \text{ isaleafnode,} \\ \max\{A(n')|n' \in C(n)\} & \text{otherwise} \end{cases} \quad (6)$$

In some examples, node scoring can be done recursively during creation of the trie. The retrieval of k candidates is done in an iterative manner, where each iteration includes a retrieval step and an update step. In some examples, all updates to the trie are temporal and will not persist across different searches.

In the retrieval step, the highest scoring node is retrieved. For a trie of max depth m, this can be done with at most m node visits, because the child node is retrieved at each level with the maximum score until the leaf node with that score is reached. The worst-case time complexity of this retrieval step over k retrievals is thus O(km).

In the update step, the node is removed from the trie by setting its score to some predefined minimum or null value and recursively updating the scores of all its ancestor nodes. Denoting the score at node n at step t (i.e., after t update steps) as $A_n^t$, the update step for each ancestor node is given by:

$$A_n^{t+1} = \max_{n' \in C(n)} A_n^{t-1} \quad (7)$$

In the worst-case scenario, for k updates, this incurs a computational complexity of O(klm) due to the need to obtain the maximum score of the child nodes at each level. However, this can be further improved by storing the child nodes as a list sorted in descending order by score. At each node, the max function can be replaced by a list traversal up to the first non-updated node and selecting the maximum value (the updated nodes are necessarily). Because the total number of updated nodes across k retrievals is less than (k−1)m (excluding the last update step), the worst-case computational complexity is O(min (km, lm)) at the $k^t$h retrieval and O(min (mk²/2, klm)) across k retrievals.

After k retrievals, there could be a need to restore the trie to its original state for subsequent searches. This can be done by storing a set of all updated nodes during the update operations. During the restoration step, the updated nodes are visited and all temporary updates are deleted. Because a maximum of (k−1)m nodes are updated across k retrievals, the worst case computational complexity is O(km).

Including all three steps, the worst-case computational complexity of the proposed method is:

$$O(km + \min(mk^2/2, klm)) \quad (8)$$

Algorithm 1 provides further detail for Top-k Retrieval For Variable k:

---
Algorithm 1: Top-k Retrieval For Variable k
---
Input: T: Trie, q: query string, k ≤ 0
Output: List of k highest scored completions of q
  N ← GetStartNodes(T, q)    list of starting nodes
  c ← empty list
  d ← empty dictionary ---
Algorithm 1: Top-k Retrieval For Variable k
---
  for i = 1 to k do
    $n_0$ ← node in N with highest score
    n ← $n_0$
    while n is not a leaf node do
      n ← highest scoring child node of n
    end while
    Append n to c    String retrieved
    if n not in d then    Store original score
      d[n] ← Score(n)
    end if
    Score(n) ← −∞
    repeat
      n ← parent node of n
      if n not in d then    Store original score
        d[n] ← Score(n)
      end if
      Score(n) ← max score of children of n
    until n! = $n_0$    Only update up to start node
  end for
  for n in d do
    Score(n) ← d[n]
  end for    Original node scores restored
  return c Continuing, given that the required number of retrievals is predetermined, the lookup process can be significantly accelerated by storing more metadata. Given a predetermined k, for each node, the score of the $k^{th}$-ranked leaf node can be stored in the sub-trie of that node. For a node n, given a function $R_k: S' \mapsto n$ that returns the $k^{th}$-ranked string by score from some set of strings $S' \in S$, this is given by:

$$A_k(n) = \begin{cases} \min(\{F_{score}(s)|n \in P(s)\}) & \text{if } |\{s \in S|n \in P(s)\}| < k, \\ R_k(\{F_{score}(s)|n \in P(s)\}) & \text{otherwise} \end{cases} \quad (9)$$

Consequently, during the retrieval step, the score of the lowest ranked word out of the top k candidate strings is known. Denoting the starting node by no, only nodes n with A (n)>=$A_k$($n_0$) will be visited, while nodes (and all nodes in their sub-tries) not meeting this condition will be ignored. If the trie is constructed such that the child nodes are ordered by decreasing score, there is no need to validate this condition for invalid nodes. Rather, the lists of child nodes for each valid node can simply be traversed in order until the first invalid node is encountered.

The worst-case computational complexity for this is O(km). In fact, compared to a node retrieval given that the top k strings are known, the only additional overhead incurred is the validation of the A(n)>=$A_k$($n_0$) condition for valid nodes (and one additional child node at each valid node). Additionally, the added advantage of allowing parallel computations is provided, because the validity condition is constant.

Algorithm 2 provides further detail for Top-k retrieval with predetermined k:

---
Algorithm 2: Top-k Retrieval With Predetermined k
---
Input T: Trie, q: query string, k ≤ 0
Output: List of k highest scored completions of q
  $n_0$ ← GetStartNode(T, q)
  τ ← $A_k$ ($n_0$)    score of $k^{th}$-ranked completion
  c ← empty list
  procedure RETRIEVE (n, τ)
    if n is not a leaf node then
      for each $n_c$ in the children of n do Algorithm 2: Top-k Retrieval With Predetermined k

```
        if Score(n_c) ≥ τ then
            RETRIEVE (n, τ)
        end if
    end for
    else
        Append n to c
    end if
end procedure
RETRIEVE (n_0, τ)
return c
```

Implementations of the present disclosure further provide for combining the approaches of Algorithms 1 and 2 to achieve a semi-parallelizable method for top-k retrieval with variable k. For example, it can be assumed that a trie has been constructed and optimized for top-$k_0$ retrieval with $A_{k_0}$ computed for all nodes. A top-k retrieval can be performed for $k>k_0$ by first retrieving the top $k_0$ candidates, followed by another $k-k_0$ candidates using the variable k method.

However, in order to perform the variable k algorithm after the top $k_0$ items have been retrieved, the update still has to be performed to update the node score of all the affected nodes. This update is performed in the same way as detailed above. However, in this case, the updates need not be performed sequentially, because all updated nodes are already known. As such, both the retrieval and update step can be parallelized allowing for hardware accelerated implementations, which can lead to significant speedup, particularly if $k>>(k-k_0)$.

In some implementations, the variable k approach (Algorithm 1) can be extended to multiple candidate starting nodes to accommodate approximate auto-complete. More particularly, given a list of possible starting nodes, a starting node with the maximum score is selected and the retrieval and update steps are performed. In a next iteration, the node with the maximum score is selected after the update, the retrieval and update steps are performed, and this repeat until k candidates have been obtained. Given q starting nodes, this incurs an additional computational complexity of O(qk) across k retrievals, which yields an overall worst case computational complexity of $$O(km + \min(mk^2/2, klm) + qk) \tag{10}$$

Because q is necessarily larger than k (it is illogical for there to be more starting nodes than required retrievals), the overhead is minimal compared to the dominant cubic term.

The incorporation of multiple starting candidates into the approach with fixed predetermined k (Algorithm 2) is less trivial. Given that it is often the case that $q<<k$, assuming that the trie has been initialized with the required $A_k(n)$ for all nodes, the straightforward solution would be to retrieve the top k strings from each node into a single set before retrieving the overall top k strings. The worst-case computational complexity for this is:

$$O(kmq + k\log(kq)) \tag{11}$$

which is superior given $q<<k$.

In some implementations, a complete trie-based approximate auto-complete can be realized with a trie-based Levenshtein (LV) automaton. It is known that the computational complexity of such a Levenshtein automaton is proportional to the product of the number of nodes in the trie and the max query string length. However, the computational complexity can be further reduced in considering that trie leaf nodes that meet the edit distance criteria are not being looked for, and instead, any intermediate nodes that meet the edit distance criteria. Once an intermediate node is found, it is included as a starting node candidate and its child nodes are not visited. As such, if a query string of length h and a max edit distance e are considered, and considering that most nodes will not be visited, the worst-case computational complexity can be given by $O(h \times h(l^e))$ for small e (since the number of possible paths fulfilling the max edit distance for a 1-character alphabet is proportional to $h(l^e)$). Although the complexity scales exponentially with e, it is not an issue since e is small.

Auto-completion in accordance with implementations of the present disclosure was experimentally validated. To this end, benchmarks were performed using the publicly available America Online (AOL) query log dataset, containing over 20 million web queries collected over 3 months. For these experiments, focus is on the speed of each auto-completion. Therefore, MostPopularCompletion was emulated, where pre-processing is first performed to order query terms by frequency, then each query term is assigned a rank (where the most frequent query has the lowest rank). Given a sub-query and a top k value, the RTT returns k queries, ordered by frequency. In practice, this rank can be extended to any arbitrary score instead of just frequency. For example, in a cold-start scenario with the absence of queries, entities have to be extracted as a proxy.

For the evaluation, implementations of the present disclosure, provide as RankedTrie, were benchmarked against (1) a linear search over all items, LinearSearch, as well as (2) using an unranked trie, UnrankedTrie, to first obtain all candidate queries that matches a sub-query, then sorting them and returning the top-k queries by rank. To also test the hypothesis that RankedTrie will be more efficient over UnrankedTrie for shorter sub-queries (that result in a larger set of query candidates), the experiments were conducted with sub-queries of length 1 to 5 for all approaches. For each experiment, 100 sub-queries were randomly selected and the average time taken for each approach to return the top-k completed queries was measured.

Table 2 shows the computation times for the trie-based autocomplete approaches described herein:

TABLE 2

Average Trie-based Auto-complete Computation Times

| | | Time (ms) | | Avg. # of Words | |
|---|---|---|---|---|---|
| k | Query Length | Var. k | Pred. k | Var. k with Auto-correct using LV | Exact | Auto-correct |
| 10 | 1 | 1.966 | 1.243 | 1.500 | 10.0 | 10.0 |
| | 2 | 1.938 | 1.151 | 1.442 | 10.0 | 10.0 |
| | 4 | 1.643 | 0.714 | 1.657 | 9.91 | 10.0 |
| | 6 | 1.513 | 0.493 | 7.234 | 8.41 | 10.0 |
| 30 | 1 | 7.803 | 4.563 | 8.641 | 30.0 | 30.0 |
| | 2 | 6.977 | 3.891 | 7.959 | 29.8 | 30.0 |
| | 4 | 4.392 | 2.013 | 7.617 | 27.6 | 30.0 |
| | 6 | 3.514 | 1.390 | 19.63 | 24.1 | 30.0 |

TABLE 2-continued

Average Trie-based Auto-complete Computation Times

| | | Time (ms) | | | Avg. # of Words | |
|---|---|---|---|---|---|---|
| k | Query Length | Var. k | Pred. k | Var. k with Auto-correct using LV | Exact | Auto-correct |
| 50 | 1 | 12.19 | 9.206 | 13.20 | 50.0 | 50.0 |
| | 2 | 10.91 | 7.690 | 12.15 | 50.0 | 50.0 |
| | 4 | 7.641 | 4.232 | 11.97 | 45.0 | 50.0 |
| | 6 | 5.111 | 1.971 | 34.60 | 38.9 | 49.9 |
| 100 | 1 | 23.95 | 8.840 | 28.04 | 100 | 100 |
| | 2 | 20.46 | 6.801 | 23.75 | 100 | 100 |
| | 4 | 14.97 | 3.916 | 20.17 | 94.1 | 100 |
| | 6 | 0.858 | 1.670 | 87.63 | 69.4 | 99.4 |

The computation times of Table 2 are computed across 100 trials for each configuration for randomly selected string suffixes from the AOL query log dataset word corpus. The results are computed for the variable k approach, predetermined k approach, and the variable k approximate auto-complete approach with the Levenshtein automaton. The results are computed across various values of k and various query string lengths.

It should be noted that, for the predetermined k method (Algorithm 2), the trie has been built with only metadata $A_k$ for k=10,40,100. When the required value of k does not match any of the predetermined k values, the results for the next highest predetermined k is computed and the results are truncated. For example, for required k=50, 100 words are returned instead, and the returned words are truncated to 50. Despite this, it is still seen that the predetermined k approach often outperforms the variable k approach.

It can also be noted that number of exact matches is often lower than required k. This is because the starting node is randomly chosen for each of the hundred trials, which means that starting nodes can be chosen that do not have the required number of child nodes (particularly for larger k and longer queries). In such situations, the approximate auto-complete is mostly still able to retrieve the required number of words since it can return words that do not match the query string exactly. In this experiment, the autocorrect using levensthein edit distance for benchmark purposes has a max edit distance e=2.

As introduced above, implementations of the present disclosure also provide for auto-correct of search queries. To ensure that the auto-correction time complexity scales optimally with the word corpus size a pre-trained distilBERT model is used to correct any misspelled words. Theoretically, increasing the number of labels in a deep learning network should have negligible changes to the inference time as the increase in the output neurons is small as compared to the rest of the network.

Figure 4:
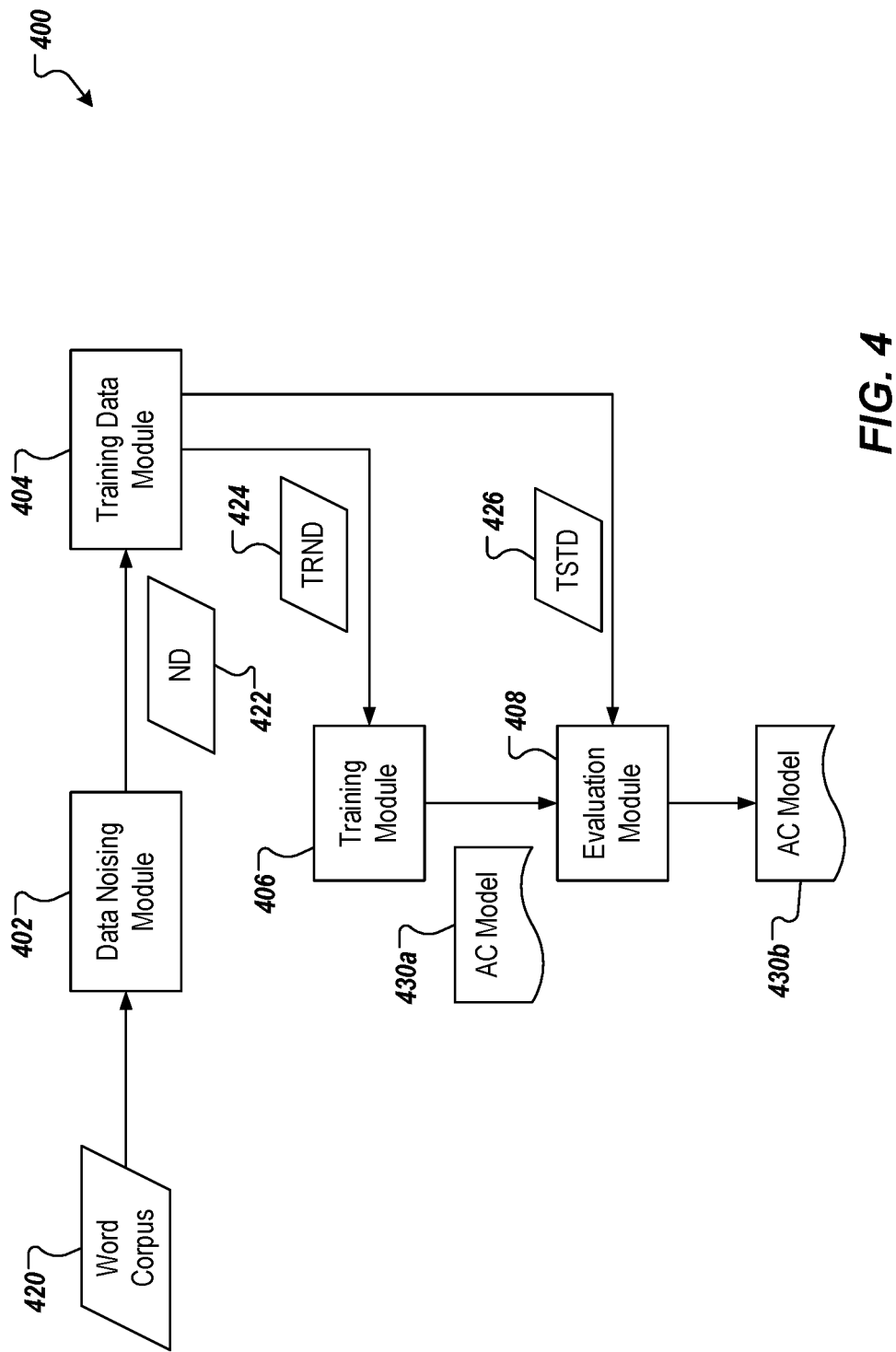
FIG. 4 depicts an example conceptual architecture for provisioning an auto-correct model in accordance with implementations of the present disclosure.

FIG. 4 depicts an example conceptual architecture 400 for provisioning an auto-correct model in accordance with implementations of the present disclosure. In the depicted example, the conceptual architecture 400 includes a data noising module 402, a training data module 404, a training module 406, and an evaluation module 420. As described in further detail herein, a word corpus 420 is processed to provide an auto-correct model 430b.

In some examples, the word corpus 420 (e.g., provided as the word corpus 222 of FIG. 2) is processed by the data noising module 402 to provide noisy data (ND) 422. In some examples, the ND 422 is a combination of word in the word corpus 420 and corrupted words (e.g., misspelled words) generated by the data noising module 402.

The ND 422 is provided to the training data module 404, which pre-processes the ND 224 to provide data for training of an auto-correct model 430a. The data for training is divided into training data (TRND) 424 and test data (TSTD) 426. In some examples, data noising can be considered as a pre-processing step, noised words/entities are training data and clean word/entities are the labels that the noised words/entities are supposed to be mapped to.

Figure 5:
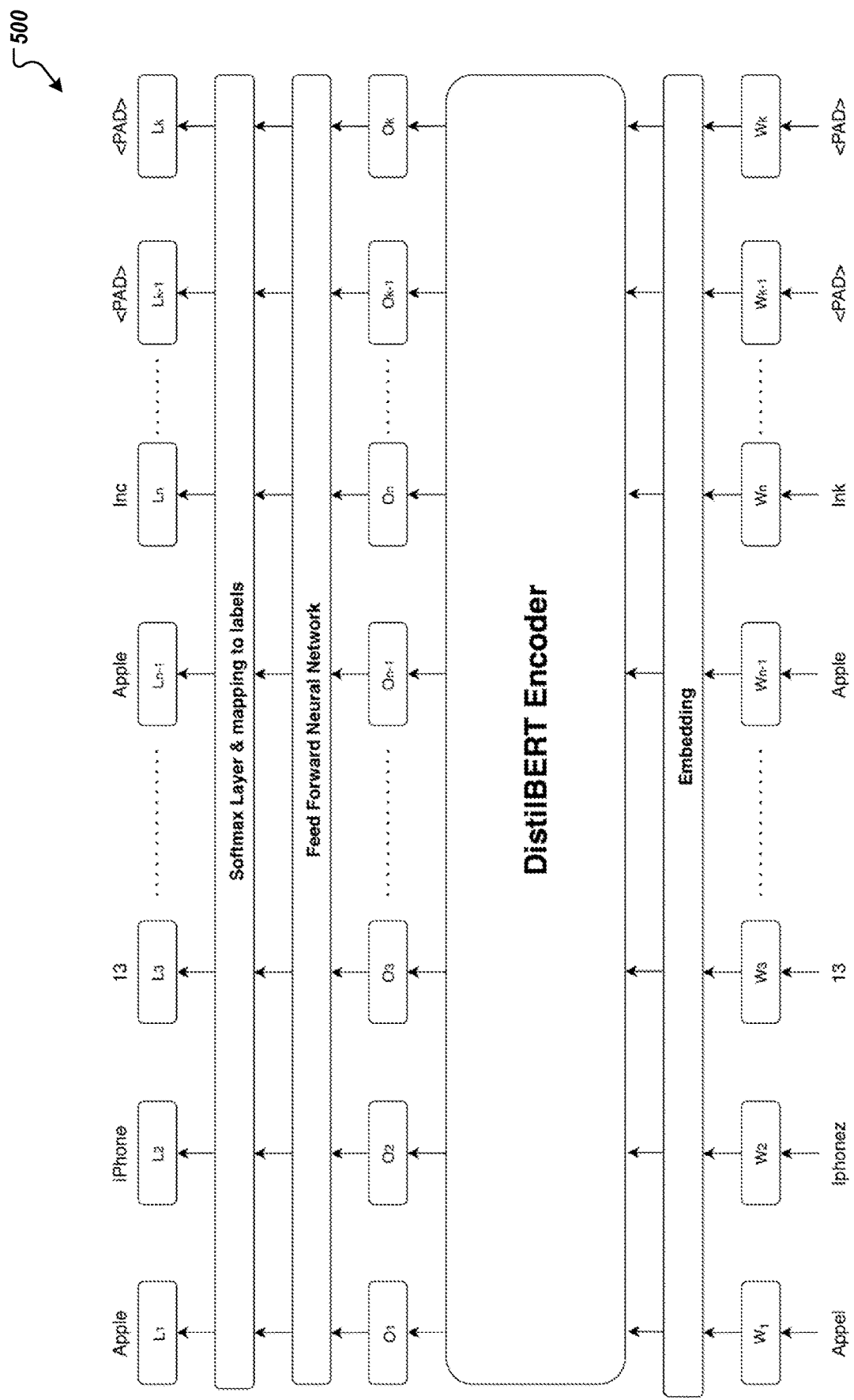
FIG. 5 depicts an example representation of an auto-correct model in accordance with implementations of the present disclosure.

The training module 406 receives the training data 424 to train the auto-correct model 430a. In some implementations, the auto-correct model 430a is provided as a pre-trained DistilBERT model that is fine-tuned by the training module 406 using the training data 424. FIG. 5 depicts an example representation 500 of the auto-correct model 430a as a DistilBert model. In some examples, the auto-correct model 430a is trained to predict correctly spelled words, as described in further detail herein.

In general, the auto-correct model 430a, as a ML model, can be iteratively trained, where, during an iteration, one or more parameters of the ML model are adjusted, and an output is generated based on the training data. For each iteration, a loss value is determined based on a loss function. The loss value represents a degree of accuracy of the output of the ML model. The loss value can be described as a representation of a degree of difference between the output of the ML model and an expected output of the ML model (the expected output being provided from training data). In some examples, if the loss value does not meet an expected value (e.g., is not equal to zero), parameters of the ML model are adjusted in another iteration of training. In some instances, this process is repeated until the loss value meets the expected value.

In some examples, the (trained) auto-correct model 430a is provided to the evaluation module 408, which evaluates performance of the auto-correct model 430a using the test data 426. In some examples, if the auto-correct model 430a is not performing as expected, the auto-correct model 430a can be re-trained and/or tuned until performance (e.g., accuracy) achieves some threshold performance. This process results in the auto-correct model 430b (e.g., the auto-correct model 430a after evaluation and revising, if any).

In further detail, in order to train the auto-correct model (e.g., the auto-correct model 430a, 430b), a set of corrupt entities corpus and clean entities corpus (e.g., the ND 422) is used as the training data. In some examples, the training data includes training labels indicating noisy data (e.g., misspelled words) and non-noisy data (e.g., correctly spelled words). As the corpus of entities is extracted from specific text description (e.g., the word corpus 420), it is not possible to obtain all of the commonly misspelled words representing these entities from any sources. To address this issue, a noising function is applied (e.g., by the data noising module 402) to the clean set of entities corpus in order to obtain a set of corrupt entities corpus. The noising function will randomly replace, swap, delete or insert any character for each word having a character count higher than a threshold number of characters (e.g., greater than 3 characters). In the case of insertion, the character to be inserted is chosen from a set of characters that are in the proximity of the character to be replaced on the keyboard (e.g., for the character j, the set of characters can include u, i, k, m, n, and h).

The auto-correct model is expected to correct each misspelled word in the query, hence token level classification is utilized to fulfill this objective. As BERT tokenizer uses a word-piece tokenizer where each word is either spilt into sub-words or remains as its full form, there is a need to keep track of the word that had been split into sub-words in order to combine the token representation of the sub-words into a single token. In this manner, classification can be done on the single token, which represents each word in the query.

A common technique to enable auto-correction is using Levenshtein (LV) distance, which is a string metric for measuring the difference between two sequences. However, this method does not scale well with the corpus size as the worst-case time complexity for measuring a single entity string is as follows:

$$O(kij) \qquad (12)$$

with k being the unique word corpus size and i being the misspelled string entity length, and j being the average length of each string in the corpus. As can be seen, if the size of the word corpus were to increase linearly, the time complexity would increase linearly as well, assuming the average length of each string does not change.

For the time complexity analysis of distilBERT as the auto-correct model, the analysis can be simplified by focusing on the self-attention layers and any feed-forward neural network. The time complexity for the attention layer can be provided as:

$$O(dn^2) \qquad (13)$$

where d is the embedding dimension. The $n^2$ term computes attention weights for each word with respect to every other word. The time complexity for the feed forward neural network is:

$$O\left(n\left(dm_1 + m_h k + \sum_{i=1}^{h-1} m_i m_{i+1}\right)\right) \qquad (14)$$

where d is the embedding dimension, n is the number of tokens, $m_i$ is the $i^{th}$ layer in the feed forward neural network, h is the total number of layers in the feed forward neural network, and k is the number of outputs, which is the total number of unique words.

As scalability of the auto-correct model is desired, Equation 14 is observed as the increase in word corpus only affects the output layer. From Equation 14, it can be seen that only the term $m_h k$ vary with the output size (k), as such it can be determined whether the increase in k causes the time complexity to increase and, if so, how it scales. The result of this review is discussed in further detail below.

The computation time of the auto-correct model, as a distilBERT model, was benchmarked against the auto-correct technique utilizing LV distance. The benchmark was done on datasets with 100, 1000, 10000, and 100k unique words. This is to observe how the computation time increases with the corpus size for both techniques. The results are shown in Table 3.

TABLE 3

| Auto-Correction Time Comparison (ms) | | | | |
| --- | --- | --- | --- | --- |
| Unique Words | 100 | 1000 | 10000 | 100000 |
| LV Time (ms) | 0.230 | 2.74 | 33.4 | 291 |
| DistillBert Time (ms) | 59.7 | 56.0 | 61.1 | 61.8 |

A review of Table 3 reveals that the computation time for LV distance auto-correct increases linearly, whereas the computation time for the BERT-based auto-correct of the present disclosure remains relatively constant. Although the computation time for LV distance auto-correct is faster for word size of 100 to 10000, at 100k words, the BERT-based auto-correct performs much better. These results show that the BERT-based auto-correct of the present disclosure is able to scale well with the word corpus size.

Use of a BERT-based model for auto-correction provides multiple advantages. For example, using a BERT based model allows for sentences to be processed as a whole rather than word-by-word, which is the case for LV distance auto-correct. If using LV distance on a sentence, that worst-case time complexity for measuring a sentence is as follows:

$$O(skij) \qquad (15)$$

with k being the corpus size, i being the misspelled string entity length, j being the average length of each string in the corpus and s being the number of words in the sentence. Hence, the worst-case time complexity using LV distance is worse than the worst-case time complexity using the BERT-based model approach of the present disclosure. As another example, using a deep neural network, such as a BERT-based model, enables more support for parallelization with GPUs, which enables more optimization techniques to be used to reduce the computation time for auto-correction.

Further, using a BERT-based model for auto-correction provides advantages in terms of the contextual aspect of the search query. For example, if a user were to type in "flying pan" instead of "frying pan," a LV distance auto-correction will fail to suggest any correction as the word "flying" is technically not misspelled. In contrast, a BERT-based model will be able to identify that a misspelling had occurred in the context and auto-correct "flying" to "frying."

Additional functions can be added on top of the DistilBert auto-correction model to improve the auto-corrected queries suggestions. Example functions include, without limitation, using beam search and integration of auto-correct and auto-complete outputs.

With regard to auto-correction with beam search, beam search can be described as a heuristic search algorithm that explores a graph by expanding the most promising node in a limited set and is provided as an optimization of best-first search to reduce memory consumption. In the context of the present disclosure, for each misspelled word, the model will output a list of token (labels the model had trained with) along with the probabilities of each token. With these probabilities, a beam search can be performed to return a list of most likely output sequences, this will improve the suggested entities for any query with misspelling(s). The model will first output top k tokens for each word and a beam search will be done where at each step, each candidate sequence is expanded with all possible next steps with the score being the sum of natural logarithm of each token possibilities. The resulting list at each time step will then be pruned to the top k sequence and this process is repeated until the end of sequence.

With regard to integration of auto-correct and auto-complete, because auto-correct outputs a list of probabilities for each token in the query, it is possible for auto-correct to suggest entities that do not exist in the word corpus. An example would be "Samsung Ultra iPhone Pro Max." As such, an alternative approach to beam search can be used, which combines outputs of the auto-correct model and the auto-complete RTT to output a list of suggested entities for any queries with typographical errors. As it cannot be assumed that such entity is not intended by a user, the top auto-corrected entity can be used with the remaining k−1 entities obtained from limiting the boundary to the entities within the RTT. In the context of the present disclosure, the top two words suggested by the auto-correct model (in term of probabilities score) at the first position of the query will be fed as prefixes into the RTT, which returns n (predetermined by user) number of possible entities that have the prefixes of the two words. Each of the tokens in the returned entities will have a probability score assigned to it from the corresponding probabilities returned by the auto-correct model. As the model will only return a list of possibilities for each token in the query, entities returned from the RTT with more number of tokens than the query will have a score of 0 assigned to the remaining tokens. These entities are then re-ranked based on the combined probabilities score of the tokens and returned to the user as suggestions.

Figure 6A:
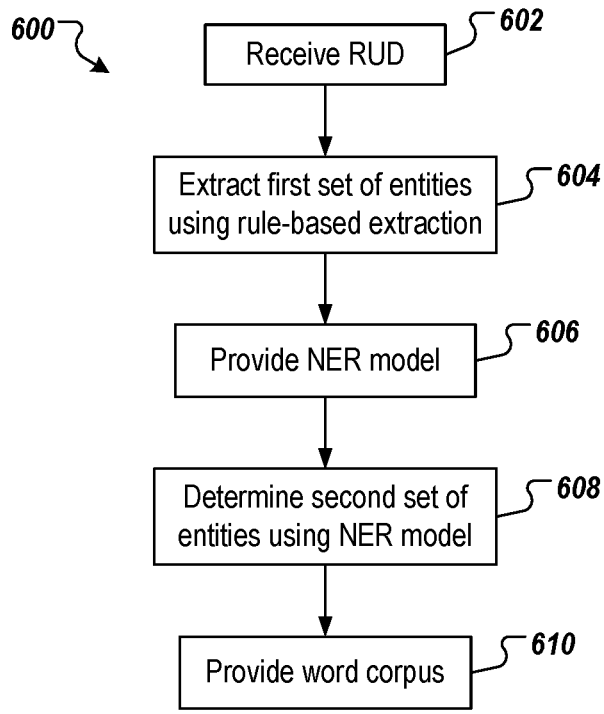
FIGS. 6A and 6B depict example processes that can be executed in accordance with implementations of the present disclosure.
Figure 6B:
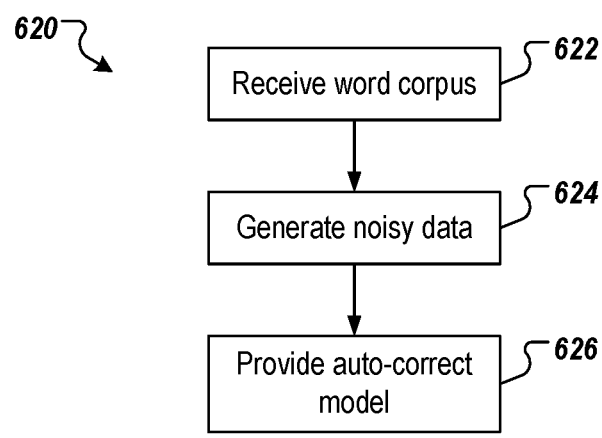

FIGS. 6A and 6B depict example processes 600, 620, respectively, that can be executed in accordance with implementations of the present disclosure. In some examples, the example processes 600, 620 are each provided using one or more computer-executable programs executed by one or more computing devices.

With regard to the example process 600 of FIG. 6A, RUD is received (602) and a first set of entities is extracted using rule-based extraction (604). For example, and as described herein with reference to FIG. 2, the entity extraction module 202 receives the RUD 220 and executes rule-based extraction to provide the set of entities 224 (as the first set of entities). In some examples, the rule-based extraction is performed using part-of-speech (POS) tags that can be extracted using, for example and without limitation, Spacy, a publicly available NLP framework. In the example context, the RUD 220 can include item descriptions for goods and/or services available through the e-commerce platform. More generally, the RUD 220 is unstructured textual data that represents entities that could be the subject of search queries.

A NER model is provided (606). For example, and as described herein, the set of entities 224 is provided to the training data module 204, which pre-processes the set of entities 224 to provide data for training of a NER model 230*a*. The data for training is divided into training data (TRND) 226 and test data (TSTD) 228. The training module 206 receives the training data 226 to train the NER model 230*a*. In some examples, the (trained) NER model 230*a* is provided to an evaluation module 208 that evaluates performance of the NER model 230*a* using the test data 228. In some examples, if the NER model 230*a* is not performing as expected, the NER model 230*a* can be re-trained and/or tuned until performance (e.g., accuracy) achieves some threshold performance. This process results in a NER model 230*b* (e.g., the NER model 230*a* after evaluation and revising, if any). A second set of entities is determined using the NER model (608). For example, and as described herein, the NER model 230*b* is provided to an inference module 210 that process the RUD 220 through the NER model 230*b* to generate the set of entities 234 (as the second set of entities). More particularly, the RUD 220 is provided as input to the NER model 230*b*, which provides the set of entities 234 as output.

A word corpus is provided (610). For example, and as described herein, the set of entities 224 and the set of entities 234 are provided as input to the duplicate removal module 212, which processes both to provide the word corpus 222. For example, the duplicate removal module 212 combines the set of entities 224 and the set of entities 234 into a super-set of entities and removes any duplicate entities, the word corpus 222 being provided as the remaining, non-duplicative entities.

With regard to the example process 620 of FIG. 6B, a word corpus is received (622) and noisy data is generated (624). For example, and as described herein with reference to FIG. 6, the word corpus 620 (e.g., provided as the word corpus 222 of FIG. 2) is received and processed by the data noising module 602 to provide noisy data (ND) 622. In some examples, the ND 622 is a combination of words in the word corpus 620 and corrupted words (e.g., misspelled words) generated by the data noising module 602. An auto-correct model is provided (626). For example, and as described herein, the ND 622 is provided to the training data module 604, which pre-processes the ND 224 to provide data for training of an auto-correct model 630*a*. The data for training is divided into training data (TRND) 624 and test data (TSTD) 626. The training module 606 receives the training data 624 to train the auto-correct model 630*a*. In some implementations, the auto-correct model 630*a* is provided as a pre-trained DistilBERT model that is fine-tuned by the training module 606 using the training data 624. In some examples, the auto-correct model 230*a* is trained to predict correctly spelled words, as described in further detail herein. The (trained) auto-correct model 630*a* is provided to the evaluation module 408, which evaluates performance of the auto-correct model 430*a* using the test data 426. In some examples, if the auto-correct model 430*a* is not performing as expected, the auto-correct model 430*a* can be re-trained and/or tuned until performance (e.g., accuracy) achieves some threshold performance. This process results in the auto-correct model 430*b* (e.g., the auto-correct model 630*a* after evaluation and revising, if any).

Figure 7:
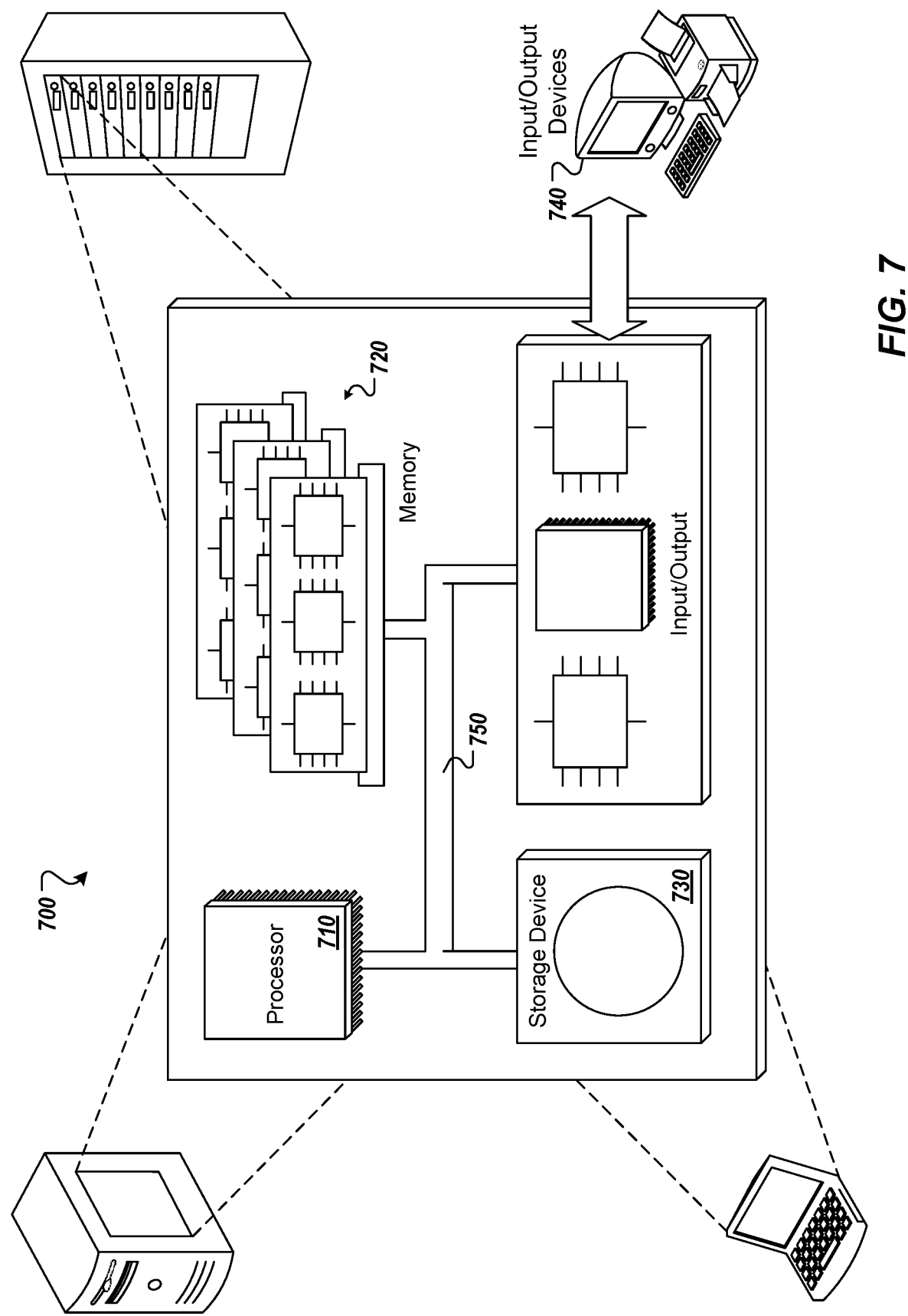
FIG. 7 is a schematic illustration of example computer systems that can be used to execute implementations of the present disclosure.

Referring now to FIG. 7, a schematic diagram of an example computing system 700 is provided. The system 700 can be used for the operations described in association with the implementations described herein. For example, the system 700 may be included in any or all of the server components discussed herein. The system 700 includes a processor 710, a memory 720, a storage device 730, and an input/output device 740. The components 710, 720, 730, 740 are interconnected using a system bus 750. The processor 710 is capable of processing instructions for execution within the system 700. In some implementations, the processor 710 is a single-threaded processor. In some implementations, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. In some implementations, the memory 720 is a volatile memory unit. In some implementations, the memory 720 is a non-volatile memory unit. The storage device 730 is capable of providing mass storage for the system 700. In some implementations, the storage device 730 is a computer-readable medium. In some implementations, the storage device 730 may be a floppy disk device, a hard disk device, an optical disk device, or a tape device. The input/output device 740 provides input/output operations for the system 700. In some implementations, the input/output device 740 includes a keyboard and/or pointing device. In some implementations, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for auto-complete of search queries received by an information retrieval (IR) system, the method being executed by one or more processors and comprising:

receiving a set of descriptions provided as unstructured data, the set of descriptions comprising item descriptions for one or more of goods and services available to be searched using the IR system, each description associated with one or more entities in a set of entities that can be queried using the IR system;

providing, from the set of descriptions, a first set of training data by applying rule-based extraction to the set of descriptions using part-of-speech (POS) tags, the first set of training data comprising at least a first set of entities comprising at least a portion of the set of entities;

training a named-entity recognition (NER) model using at least a portion of the first set of training data;

constructing a ranked trie-tree (RTT) using a set of extracted entities determined from the NER model, each extracted entity having an associated confidence score;

receiving, by the IR system, a portion of a search query; and processing the portion of the search query using the RTT to provide a set of auto-complete suggestions comprising k auto-complete suggestions determined through order-specific traversal of the RTT that is terminated after finding the k auto-complete suggestions based on confidence scores, during processing, changing the confidence score of an extracted entity to a predefined minimum score within the RTT in response to adding the extracted entity to the set of auto-complete suggestions to prevent the extracted entity being selected as having a highest score in subsequent processing; and after determining the set of auto-complete suggestions, updating the RTT to restore confidence scores of extracted entities included in the set of auto-complete suggestions.

2. The method of claim 1, further comprising:
processing the set of descriptions through the NER model to provide a second set of entities;
generating a word corpus based on the first set of entities and the second set of entities;
training an auto-correct model using a second set of training data that is provided using at least a portion of the word corpus; and
prior to providing the set of auto-complete suggestions, processing the portion of the search query through the auto-correct model to correct at least part of the portion of the search query.

3. The method of claim 2, wherein the second set of training data comprises the at least a portion of the word corpus and noise that is generated based on the at least a portion of the word corpus.

4. The method of claim 1, wherein training the NER model comprises:
receiving the NER model as a pre-trained model; and
fine-tuning the NER model through training using the at least a portion of the first set of training data.

5. The method of claim 1, wherein the NER model comprises a Bidirectional Encoder Representations from Transformers (BERT)-based model.

6. The method of claim 1, further comprising determining a word corpus based on the NER model, the word corpus comprising unique entities determined from the set of descriptions, the unique entities populating the set of entities and each unique entity being associated with a confidence score.

7. The method of claim 6, wherein each score represents a frequency of occurrence of a respective unique entity in the set of descriptions.

8. A non-transitory computer-readable storage medium coupled to one or more processors and having instructions stored thereon which, when executed by the one or more processors, cause the one or more processors to perform operations for auto-complete of search queries received by an information retrieval (IR) system, the operations comprising:
receiving a set of descriptions provided as unstructured data, the set of descriptions comprising item descriptions for one or more of goods and services available to be searched using the IR system, each description associated with one or more entities in a set of entities that can be queried using the IR system;
providing, from the set of descriptions, a first set of training data by applying rule-based extraction to the set of descriptions using part-of-speech (POS) tags, the first set of training data comprising at least a first set of entities comprising at least a portion of the set of entities;
training a named-entity recognition (NER) model using at least a portion of the first set of training data;
constructing a ranked trie-tree (RTT) using a set of extracted entities determined from the NER model, each extracted entity having an associated confidence score;
receiving, by the IR system, a portion of a search query; and
processing the portion of the search query using the RTT to provide a set of auto-complete suggestions comprising k auto-complete suggestions determined through order-specific traversal of the RTT that is terminated after finding the k auto-complete suggestions based on confidence scores, during processing, changing the confidence score of an extracted entity to a predefined minimum score within the RTT in response to adding the extracted entity to the set of auto-complete suggestions to prevent the extracted entity being selected as having a highest score in subsequent processing; and
after determining the set of auto-complete suggestions, updating the RTT to restore confidence scores of extracted entities included in the set of auto-complete suggestions.

9. The non-transitory computer-readable storage medium of claim 8, wherein operations further comprise:
processing the set of descriptions through the NER model to provide a second set of entities;
generating a word corpus based on the first set of entities and the second set of entities;
training an auto-correct model using a second set of training data that is provided using at least a portion of the word corpus; and
prior to providing the set of auto-complete suggestions, processing the portion of the search query through the auto-correct model to correct at least part of the portion of the search query.

10. The non-transitory computer-readable storage medium of claim 9, wherein the second set of training data comprises the at least a portion of the word corpus and noise that is generated based on the at least a portion of the word corpus.

11. The non-transitory computer-readable storage medium of claim 8, wherein training the NER model comprises:
receiving the NER model as a pre-trained model; and
fine-tuning the NER model through training using the at least a portion of the first set of training data.

12. The non-transitory computer-readable storage medium of claim 8, wherein the NER model comprises a Bidirectional Encoder Representations from Transformers (BERT)-based model.

13. The non-transitory computer-readable storage medium of claim 8, wherein operations further comprise determining a word corpus based on the NER model, the word corpus comprising unique entities determined from the set of descriptions, the unique entities populating the set of entities and each unique entity being associated with a confidence score.

14. The non-transitory computer-readable storage medium of claim 13, wherein each score represents a frequency of occurrence of a respective unique entity in the set of descriptions.

15. A system, comprising:
a computing device; and
a computer-readable storage device coupled to the computing device and having instructions stored thereon which, when executed by the computing device, cause the computing device to perform operations for auto-complete of search queries received by an information retrieval (IR) system, the operations comprising:
receiving a set of descriptions provided as unstructured data, the set of descriptions comprising item descriptions for one or more of goods and services available to be searched using the IR system, each description associated with one or more entities in a set of entities that can be queried using the IR system;
providing, from the set of descriptions, a first set of training data by applying rule-based extraction to the set of descriptions using part-of-speech (POS) tags, the first set of training data comprising at least a first set of entities comprising at least a portion of the set of entities;

training a named-entity recognition (NER) model using at least a portion of the first set of training data;

constructing a ranked trie-tree (RTT) using a set of extracted entities determined from the NER model, each extracted entity having an associated confidence score;

receiving, by the IR system, a portion of a search query; and processing the portion of the search query using the RTT to provide a set of auto-complete suggestions comprising k auto-complete suggestions determined through order-specific traversal of the RTT that is terminated after finding the k auto-complete suggestions based on confidence scores, during processing, changing the confidence score of an extracted entity to a predefined minimum score within the RTT in response to adding the extracted entity to the set of auto-complete suggestions to prevent the extracted entity being selected as having a highest score in subsequent processing; and after determining the set of auto-complete suggestions, updating the RTT to restore confidence scores of extracted entities included in the set of auto-complete suggestions.

16. The system of claim 15, wherein operations further comprise:

processing the set of descriptions through the NER model to provide a second set of entities;

generating a word corpus based on the first set of entities and the second set of entities;

training an auto-correct model using a second set of training data that is provided using at least a portion of the word corpus; and prior to providing the set of auto-complete suggestions, processing the portion of the search query through the auto-correct model to correct at least part of the portion of the search query.

17. The system of claim 16, wherein the second set of training data comprises the at least a portion of the word corpus and noise that is generated based on the at least a portion of the word corpus.

18. The system of claim 15, wherein training the NER model comprises:

receiving the NER model as a pre-trained model; and fine-tuning the NER model through training using the at least a portion of the first set of training data.

19. The system of claim 15, wherein the NER model comprises a Bidirectional Encoder Representations from Transformers (BERT)-based model.

20. The system of claim 15, wherein operations further comprise determining a word corpus based on the NER model, the word corpus comprising unique entities determined from the set of descriptions, the unique entities populating the set of entities and each unique entity being associated with a confidence score.

\* \* \* \* \*